(12) United States Patent
Furuuchi et al.

(10) Patent No.: US 8,315,850 B2
(45) Date of Patent: Nov. 20, 2012

(54) WEB TRANSLATION PROVIDER

(75) Inventors: Yuki Furuuchi, Tokyo (JP); Yusuke Jinnai, Kanagawa (JP); Shunichi Honma, Kanagawa (JP); Atsushi Wada, Tokyo (JP)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/116,843

(22) Filed: May 26, 2011

(65) Prior Publication Data

US 2011/0231181 A1    Sep. 22, 2011

Related U.S. Application Data

(63) Continuation of application No. 11/955,000, filed on Dec. 12, 2007, now Pat. No. 7,974,832.

(51) Int. Cl.
*G06F 17/28* (2006.01)
(52) U.S. Cl. ................... 704/7; 704/2; 704/277
(58) Field of Classification Search ........... 704/1–10, 704/277, 270, 270.1, 251, 257; 1/1
See application file for complete search history.

(56) References Cited

U.S. PATENT DOCUMENTS

| | | | |
|---|---|---|---|
| 5,140,522 A | 8/1992 | Ito et al. | |
| 6,347,316 B1 * | 2/2002 | Redpath | ................................ 1/1 |
| 6,604,101 B1 | 8/2003 | Chan et al. | |
| 6,952,691 B2 | 10/2005 | Drissi et al. | |
| 6,993,471 B1 | 1/2006 | Flanagan et al. | |
| 6,999,916 B2 | 2/2006 | Lin et al. | |
| 7,146,358 B1 | 12/2006 | Gravano et al. | |
| 7,627,479 B2 * | 12/2009 | Travieso et al. | ............... 704/277 |
| 7,983,897 B2 * | 7/2011 | Chin et al. | ........................ 704/2 |
| 2003/0187681 A1 | 10/2003 | Spain | |
| 2006/0173829 A1 | 8/2006 | Neeman | |
| 2006/0277189 A1 | 12/2006 | Cencini | |
| 2007/0106653 A1 | 5/2007 | Sun | |

OTHER PUBLICATIONS

Lin, "Machine Translation for Information Access across the Language Barrier: the MuST System," In Machine Translation Summit VII, Sep. 13-17, 1999; 9 pages, Singapore.
Ma et al., "BITS: A Method for Bilingual Text Search over the Web," printed from https://research.microsoft.com/~cyl/download/papers/MuST-MT-Summit-VII-final.pdf, 1999, 6 pages, Singapore.

* cited by examiner

*Primary Examiner* — Huyen X. Vo
(74) *Attorney, Agent, or Firm* — Senniger Powers LLP (57) ABSTRACT

A web translation server discovers a document address for a document. The document is accessed and parsed for text data in a first language. The parsed text data is translated into text data in a second language and stored in a database. A client accesses the document and sends a request including the document address to the web translation server. The translated text data in the second language is retrieved from the database based on the document address and sent to the client. The client renders the translated text data in the second language.

17 Claims, 6 Drawing Sheets

| DOC ID | PID | Original | Japanese | Chinese | Spanish |
|---|---|---|---|---|---|
| http://www.abcd.com/default.mspx | 1 | Keeping Out of the Kernel: UMDF Beats the Blues | カーネルから締め出す: UMDF がブルーをやっつける | 保持在仁外面。UMDF 捧打藍色。 | El guardar fuera del Kernel: UMDF bate los azul |
| http://www.abcd.com/default.mspx | 2 | User-mode drivers have access only to user address space - reducing risks to system stability. UMDF makes it easy to support protocol- and serial-based devices. | ユーザー モード ドライバは、ユーザー アドレス スペースにのみアクセスし、シ ステムの安定性に対するリス クを減少します。UMDF により、プロトコル ベースシリアル ベースのデバイスを容易にサ ポートできます。 | 使用者模式驅動程式能存 取使用者位址空間 - 以減少道成系統不穩定之風 險。UMDF 使得支援以通訊協定以及序 列埠為基礎之裝置變更容 易。 | los conductores del Usuario-modo tienen acceso solamente al espacio de dirección del usuario - reducción de riesgos a la estabilidad del sistema. UMDF hace fácil apoyar los dispositivos del protocolo y serial-basado. |
| http://www.abcd.com/whdc/default.mspx | 3 | Download UMDF 1.0 | UMDF 1.0 のダウンロード | 下載 UMDF 1.0 | Transferencia directa UMDF 1.0 |
| http://www.abcd.com/whdc/default.mspx | 4 | About User Mode Driver Framework | ユーザー モード ドライバ フレームワークについて | 關於 User Mode Driver Framework | Sobre Marco Del Conductor Del Modo Del Usuario |

WEB TRANSLATION PROVIDER

CROSS-REFERENCE TO RELATED APPLICATIONS

This application is a continuation of U.S. patent application Ser. No. 11/955,000, filed Dec. 12, 2007, all of which is hereby incorporated by reference in its entirety for all purposes.

BACKGROUND

Millions of users utilize the Internet on a daily basis to keep with the news, engage in hobbies, and participate in work related activities. And, there are millions of web pages available through the Internet; however, the majority of pages are written in English. Therefore, people who cannot read English cannot understand the majority of the information available through the Internet.

Translation software is available in the marketplace, but the software is typically installed on the end user's local PC. And, although some web-based translation tools are available on the Internet, the tools perform translation every time the user requests a web page. Therefore, these tools are slow and increase network traffic by requiring a translation every time a user requests a web page.

SUMMARY

Embodiments of the invention include a web translation server for providing translations of documents to clients. In an embodiment, the web translation server discovers a document address for a document. The document is accessed and parsed for text data in a first language. The parsed text data is translated into text data in a second language and stored in a database. A client accesses the document and sends a request including the document address to the web translation server. The translated text data in the second language is retrieved from the database based on the document address and sent to the client. The client renders the translated text data in the second language.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

DETAILED DESCRIPTION

Figure 1:
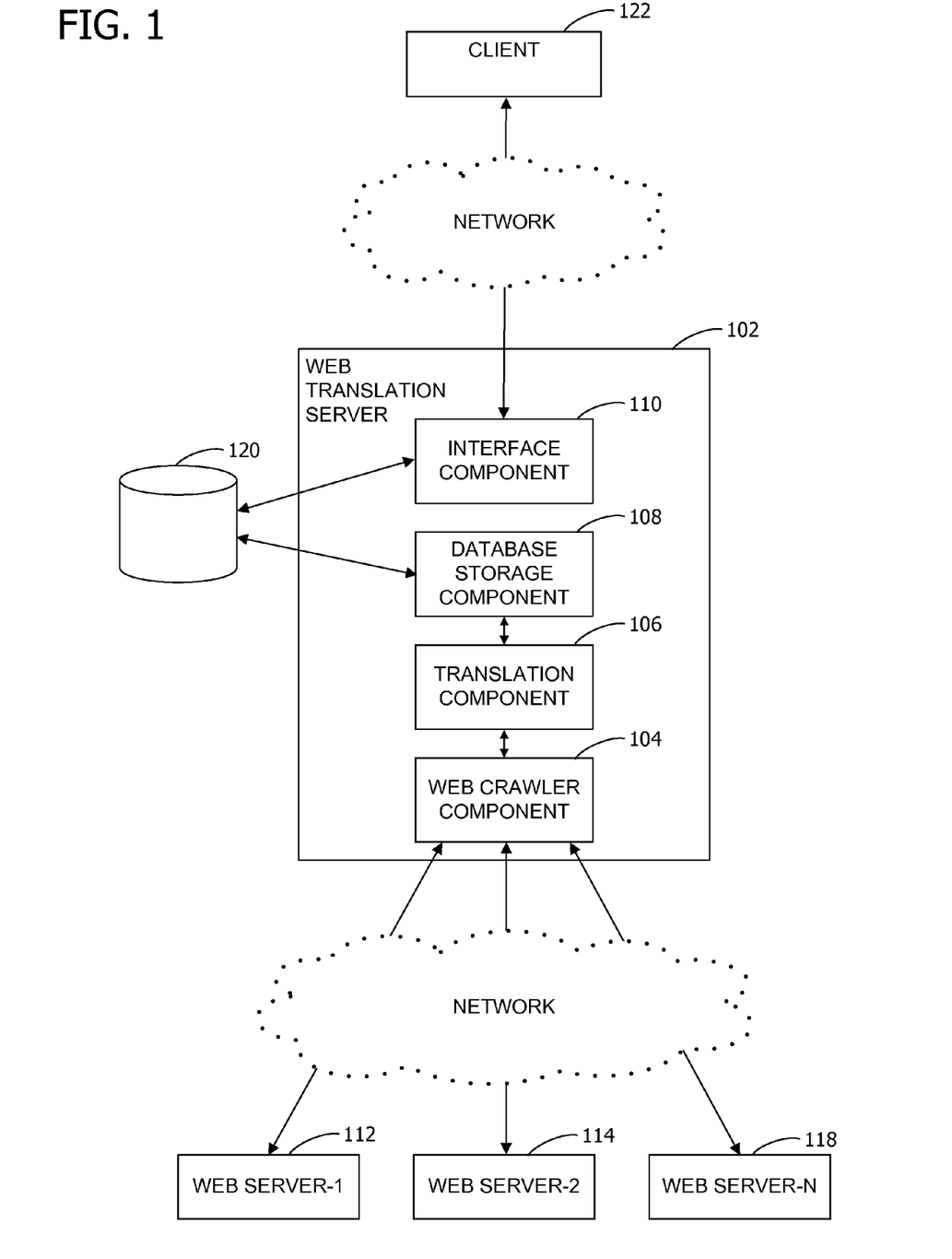
FIG. 1 is a block diagram illustrating one example of a suitable computing system environment in which the invention may be implemented.

FIG. 1 illustrates a system for providing web page document translations by a web translation server 102 according to aspects of the invention. The web translation server 102 includes a web crawler component 104, a translation component 106, a database storage component 108, and an interface component 110. For purposes of illustration, programs and other executable program components, such as the web crawler component 104, translation component 106, database storage component 108, and interface component 110, are illustrated herein as discrete blocks. It is recognized, however, that such programs and components reside at various times in different storage components of the computer, and are executed by the data processor(s) of the computer.

The web crawler component 104 discovers a document address for a web page or other document. In an embodiment, the document address is an URL (Uniform Resource Locator). In another embodiment, the web crawler component 104 includes a web crawler or spider which seeks out web pages located on web servers (e.g., web server-1 112, web server-2 114, web server-N 118). The web crawler (also known as a web spider or web robot) is a program or automated script which browses the Internet or other networks in a methodical, automated manner. Many sites, in particular search engines, use spidering as a means of providing up-to-date data. Web crawlers are mainly used to create a copy of all the visited pages for later processing by a search engine that will index the downloaded pages to provide fast searches. In general, the web crawler starts with a list of URLs to visit, called the seeds. As the crawler visits these URLs, it identifies all the hyperlinks in the page and adds them to the list of URLs to visit, called the crawl frontier. URLs from the frontier are recursively visited according to a set of policies. Web crawlers are well known and widely used in the art.

The translation component 106 accesses the web pages based on the document address discovered by the web crawler component 104. The translation component 106 parses the accessed web page into a plurality of clusters or paragraphs, each cluster containing text data in a first language. The translation component 106 associates each cluster with a cluster identifier and translates the text data in each cluster into translated text data in a second language. Advantageously, because the page is translated by cluster or paragraph, the user can read the original web page while referring the translated contents at the same time (see, FIG. 6). This is particularly useful if the user is trying to learn a new language.

Referring again to FIG. 1, the database storage component 108 stores the text data in the first language for each cluster and the corresponding translated text data for each cluster in the database 120. The database storage component 108 references the cluster identifier and document address with the stored text data and the translated text data for each cluster.

The interface component 110 receives a request including the document address and the cluster identifier from a client 122. In an embodiment, the client 122 sends the request to the interface component 110 if the first language is not associated with a locale of the client 122 rendering the document in the first language. The interface component 110 retrieves the translated text data in the second language from the database based on the document address and the cluster identifier included in the request. The interface component 110 sends the translated text data in the second language to the client 122.

The client 122 renders the translated text data in the second language in a web browser. Alternatively, the client 122 renders the translated text data in the second language in a display box overlaying the text data in the first language of the document rendered in the web browser.

Figure 2:
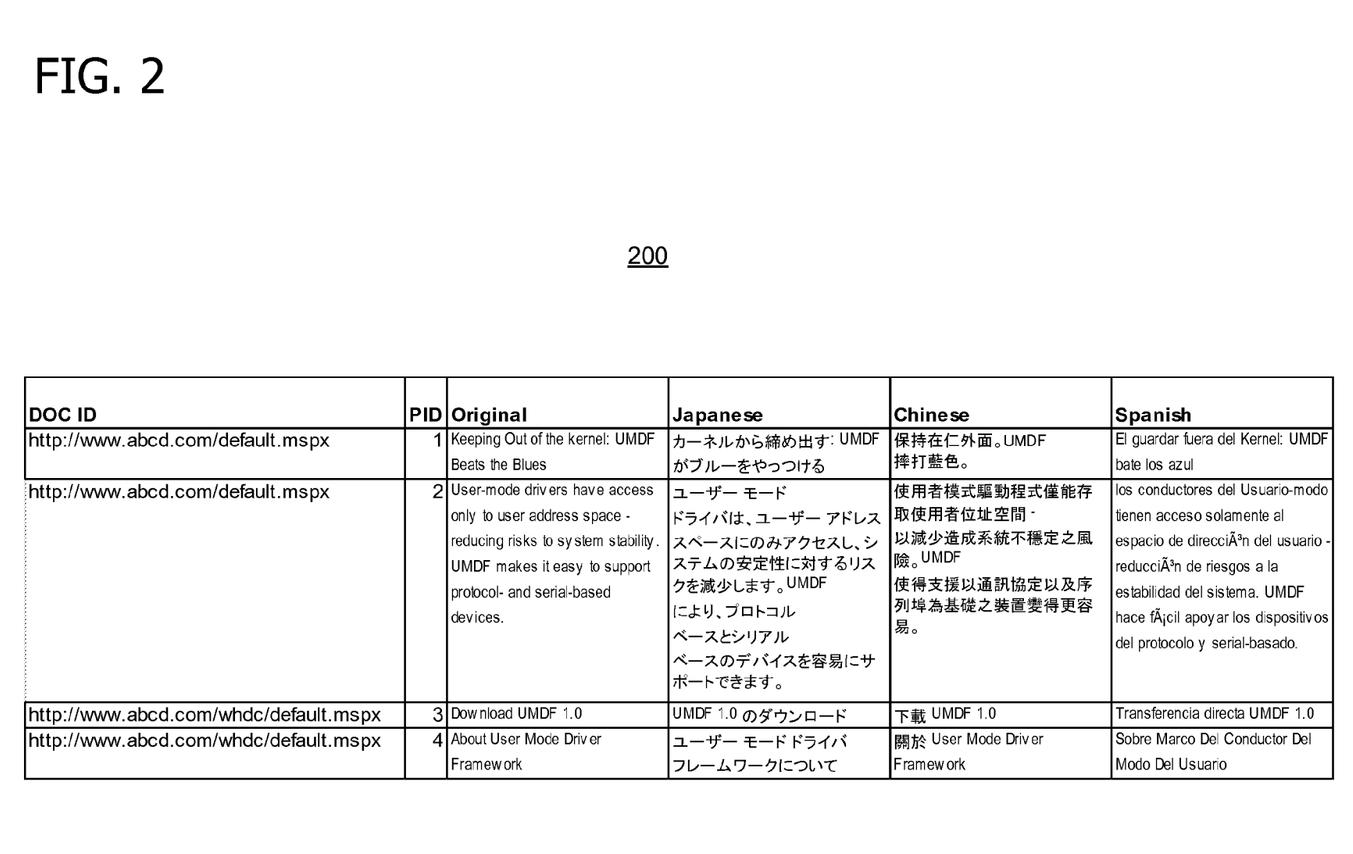
FIG. 2 is an exemplary embodiment of a database including the document address and the translated text data.

In an alternative embodiment, the translation component 106 translates the parsed text data is into additional text data in a third language and the additional text data in the third language is stored in the database 120. In this embodiment, the client 122 may request the translated text data in the second and/or the third language based on the document address and the cluster identifier. For example, FIG. 2 illustrates an embodiment where the original English text data has been translated into Japanese, Chinese and Spanish and stored in the database 120. In the example, four clusters have been located on the web page "http://www.abcd.comidefault.htm" The original text of the cluster and its corresponding translations are stored in the database. Advantageously, because the original text is stored in the database, new translations can easily be generated without accessing the original document.

Figure 3:
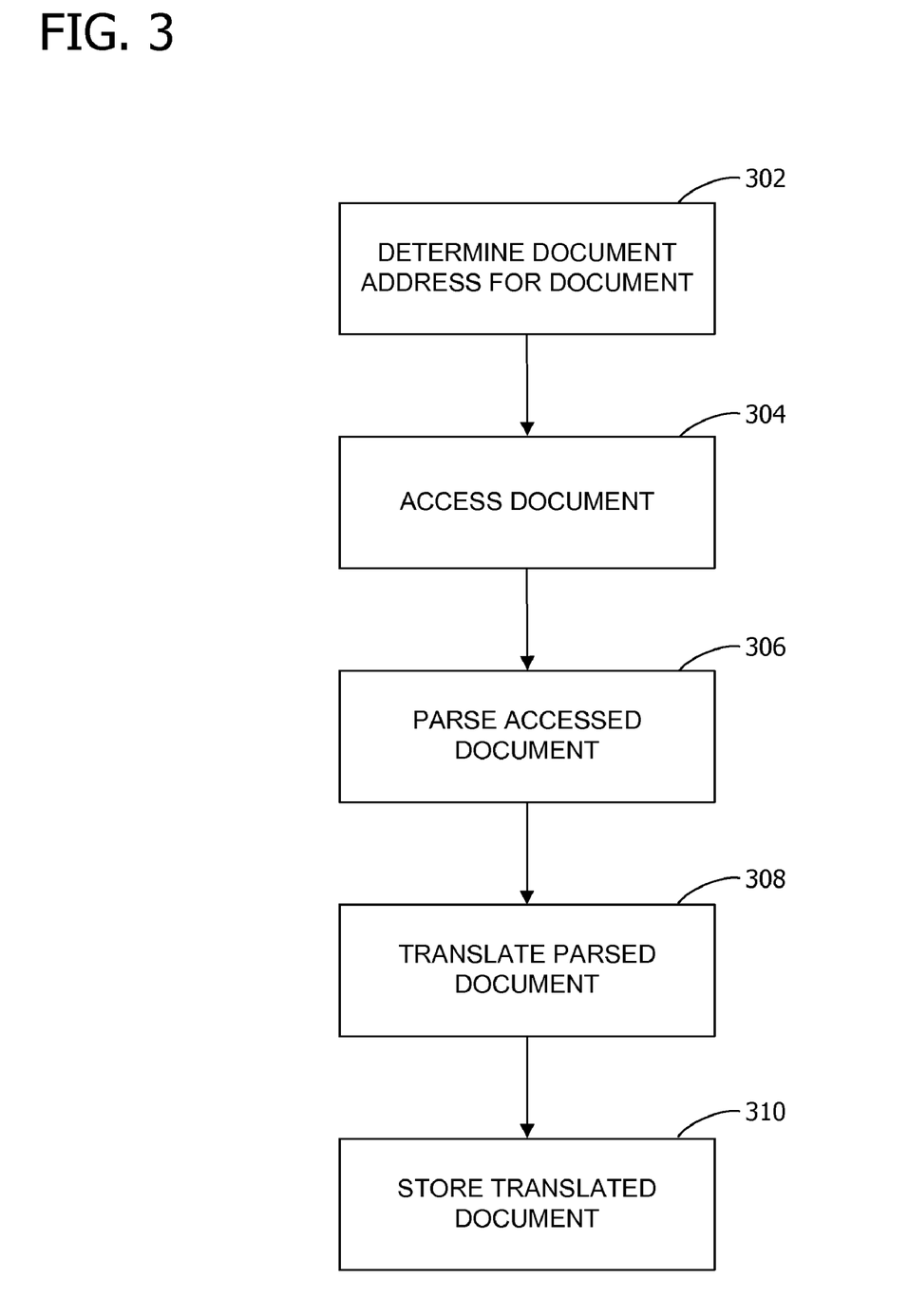
FIG. 3 is an exemplary flow chart illustrating the creation of a document translation database.

FIG. 3 illustrates a method for creating a document translation database. At 302, the web translation server 102 determines a document address for a document. In an embodiment, the document address is an URL. In another embodiment, a web crawler (e.g., a spider) is used to determine the document address for the document. Additionally, the scope of web crawler can be limited. Thus, translations can be provided as one of the services of a web site and the client 122 visiting the site can receive document translations passively rather than actively while browsing on the site.

At 304, the web translation server 102 accesses the document based on the document address. In an embodiment, the document includes one or more of the following: a web page, a word processing document, a spreadsheet document, a slide show presentation document, an email message, and a text document. And, at 306, the web translation server 102 parses the accessed document for text data in a first language. In an embodiment, the document is parsed to determine how it should be indexed. For example, the document is searched for meaningful text and split into paragraphs or clusters of words. Each cluster is numbered with a unique ID for indexing. In an embodiment, the web translation server 102 stores the parsed text data in the first language with the ID in the document translation database 120.

At 308, the web translation server 102 translates the parsed text data into translated text data in a second language different than the first language. In an embodiment, the translation is performed manually by a human. Alternatively, a machine translation engine translates the text data. Machine translation software translates text or speech from one natural language to another using a computer. At its basic level, machine translation software performs simple substitution of words in one natural language for words in another. Using other techniques, more complex translations may be attempted, allowing for better handling of differences in linguistic typology, phrase recognition, and translation of idioms, as well as the isolation of anomalies. And, improved output quality can be achieved by human intervention. For example, some systems are able to translate more accurately if the user has unambiguously identified which words in the text are names. Machine translation software is well known and widely used in the art.

At 310, the web translation server 102 stores the translated text data in the second language in the document translation database 120 referenced by the document address. Advantageously, the method may be performed on existing web sites without modification saving the costs associated with modifying every single web page and/or the structure of the existing web site in order to provide translations.

The client 122 may request the translated text data in the second language from the web translation server 102 based on the document address. The web translation server 102 receives the request from the client including the document address. The web translation server 102 retrieves the translated text data in the second language from the database 120 based on the document address included in the request. Next, the web translation server 102 sends the translated text data in the second language to the client 122. The client 122 renders the translated text data in the second language. In an embodiment, the client 122 renders the translated text data in the second language in a browser executing on the client 122.

In another embodiment, the parsed text data is translated into additional text data in a third language and the additional text data is stored in the database 120. In this embodiment, the client 122 may request the translated text data in the second and/or the third language based on the document address.

In yet another embodiment, the web translation server 102 divides the text data of the document into a plurality of paragraphs or clusters, each paragraph including text data in the first language. A paragraph ID is assigned to each of the plurality of paragraphs. The web translation server 102 translates each of the plurality of paragraphs in the first language to a corresponding plurality of paragraphs in the second language. And, the web translation server 102 stores each of the plurality of paragraphs along with the corresponding translated text data in the second language and corresponding paragraph ID in the document translation database 120. In this embodiment, the client 122 requests the translated text data in the second language from the web translation server 102 based on the document address and the paragraph ID.

Figure 4:
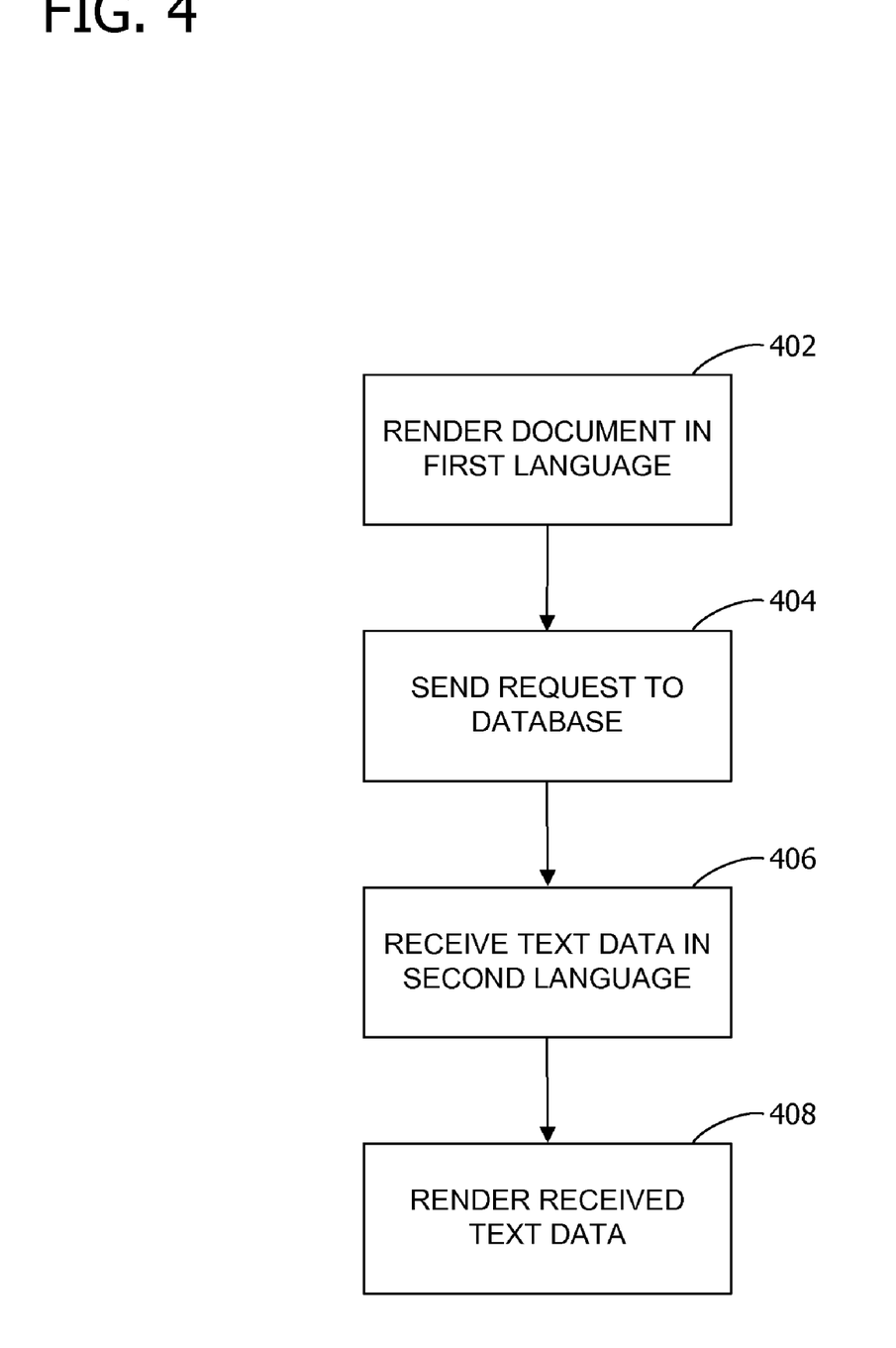
FIG. 4 is an exemplary flow chart illustrating the rendering of translated text data.

FIG. 4 illustrates an embodiment of a method for rendering text data in a second language. At 402, the client 122 renders the document. The document is associated with a document address and includes text data in a first language.

At 404, in response to rendering the document, the client 122 sends the request including the document address to the database 120. In response to receiving the request, the database 120 retrieves the translated text data in a second language based on the document address included in the request.

In an embodiment, the client 122 sends the request to the database 120 if the first language is not associated with a locale of the client 122 rendering the document. A locale is a set of parameters that defines the user's language, country and any special variant preferences that the user wants to see in their user interface. Typically, the locale identifier consists of at least a language identifier and a region identifier.

At 406, the client 122 receives translated text data in the second language from the database 120. The database 120 sends the translated text data in the second language in response to the received request. Since the translated text data is already available on the web translation server 102, the web translation server 102 retrieves the translated text data from the database 120 when requested without having to translate the document on the fly. And, because web translation server 102 does not have to translate the document on the fly every time the client 122 requests translated text data, the web translation server 102 is faster and reduces network traffic compared to typical translation solutions.

At 408, in response to receiving the translated text data, the client 122 renders the received translated text data in the second language. In an embodiment, the text data in the first language and the received translated text data in the second language are rendered in a web browser of the client 122. Alternatively, the client 122 renders the received translated text data in the second language in a display box overlaying the text data in the first language of rendered document (e.g., FIG. 6). In another embodiment, the translated text data in the second language is rendered in the web browser of the client 122 by a plug-in or add-on installed on the client 122.

Figure 5:
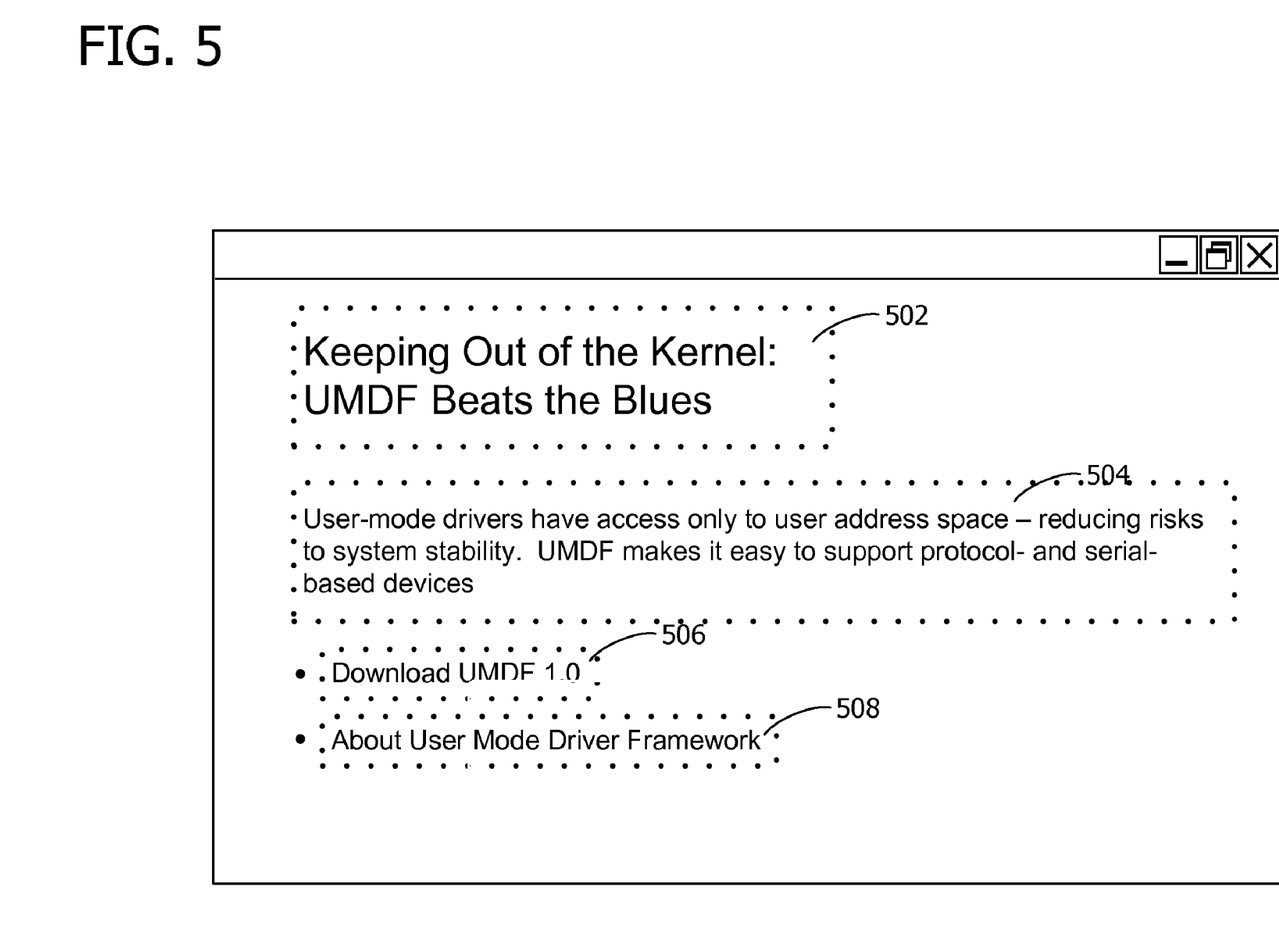
FIG. 5 is a block diagram of an exemplary web page including a plurality of paragraphs with text data.

Referring now to FIG. 5, FIG. 5 illustrates an alternative embodiment where the web translation server 102 divides the text data of the document into a plurality of paragraphs (e.g, paragraph 502, 504, 506, 508), each paragraph including text data in the English language. The web translation server 102 assigns each paragraph 502, 504, 506, 508 an paragraph ID and stores the English text data and text data translated into the Chinese language in the database 120.

Figure 6:
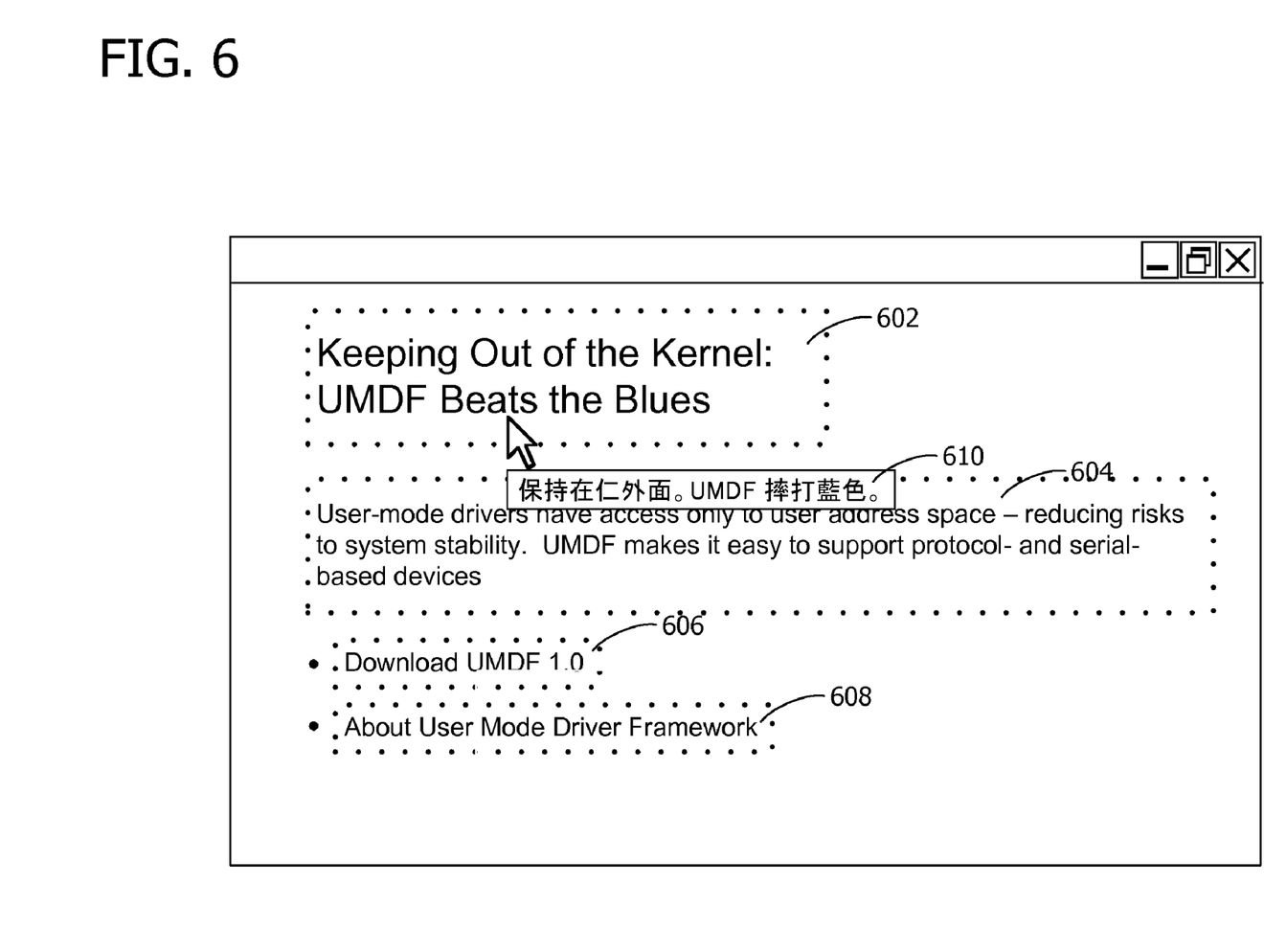
FIG. 6 is a block diagram of an exemplary web page including translated text data Corresponding reference characters indicate corresponding parts throughout the drawings.

Now referring to FIG. 6, the client 122 renders the document in a browser. The sections 602, 604, 606, 608 correspond to the English text paragraphs 502, 504, 506, 508 stored in the database 120. The client 122 detects a location of a cursor hovering over a section 602 of rendered text data in the English language. In response to the detection, the client 122 sends the request including the document address and the detected cursor location to the database 120.

In response to receiving the request, the database 120 retrieves the Chinese text data in the second language based on the document address and the cursor location included in the request. The client 122 receives the section of the translated text data in the Chinese language from the database 120. Next, the client 122 renders the received translated text data in the Chinese language in a display box 610 overlaying the text data in the English language of rendered document approximately at the cursor location. In an embodiment, the text box 610 is a pop-up window of a browser. Alternatively, the text box 610 may include one or more of the following: a status bar, a tooltip, and balloon callout. For example, the tooltip is a common graphical user interface element used in conjunction with the cursor, usually a mouse pointer. The user hovers the cursor over an item, without clicking it, and a box appears with supplementary information regarding the item being hovered over. User interfaces which can detect the position of a hovering cursor and display text in a display box are well known and widely used in the art.

In another embodiment, the browser or other user interface program detects the position of mouse pointer and determines the corresponding section of the document where the cursor is hovering. Alternatively, a script, a browser add-in, applet, or Active X control installed with the browser may be used to detect the hovering cursor and display the display box 610.

Referring again to FIG. 1, FIG. 1 shows one example of a general purpose computing device in the form of a computer (e.g., web translation server 102, web server-1 112, web server-2 114, web server-N 118, client 122). In one embodiment of the invention, a computer such as the computer (e.g., web translation server 102, web server-1 112, web server-2 114, web server-N 118, client 122) is suitable for use in the other figures illustrated and described herein. Computer (e.g., web translation server 102, web server-1 112, web server-2 114, web server-N 118, client 122) has one or more processors or processing units and a system memory.

The computer (e.g., web translation server 102, web server-1 112, web server-2 114, web server-N 118, client 122) typically has at least some form of computer readable media. Computer readable media, which include both volatile and nonvolatile media, removable and non-removable media, may be any available medium that may be accessed by computer (e.g., web translation server 102, web server-1 112, web server-2 114, web server-N 118, client 122). By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer (e.g., web translation server 102, web server-1 112, web server-2 114, web server-N 118, client 122).

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

FIG. 1 also shows a removable, nonvolatile magnetic disk (e.g., storage device 120). Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The drives (e.g., storage device 120) or other mass storage devices and their associated computer storage media discussed above and illustrated in FIG. 1, provide storage of computer readable instructions, data structures, program modules and other data for the computer (e.g., web translation server 102, web server-1 112, web server-2 114, web server-N 118, client 122).

The computer (e.g., web translation server 102, web server-1 112, web server-2 114, web server-N 118, client 122) may operate in a networked environment using logical connections to one or more remote computers. The remote computer may be a personal computer, a server, a router, a network PC, a peer device or other common network node, and typically includes many or all of the elements described above relative to computer (e.g., web translation server 102, web server-1 112, web server-2 114, web server-N 118, client 122). The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of computer (e.g., web translation server 102, web server-1 112, web server-2 114, web server-N 118, client 122) are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

Although described in connection with an exemplary computing system environment, including computer (e.g., web translation server 102, web server-1 112, web server-2 114, web server-N 118, client 122), embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., web translation server 102, web server-1 112, web server-2 114, web server-N 118, client 122) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for creating a document translation database by a computing device, comprising:
    storing, by the computing device, document addresses for documents in the document translation database, each document including text data in a first language, wherein the storing is recursively performed according to a set of policies;
    determining, by the computing device, a document address in the document translation database for a particular document in a first language to be translated into a second language, wherein the first language is different than the second language;
    accessing, by the computing device, the particular document in a first language based on its determined document address stored in the document translation database;
    parsing, by the computing device, the accessed document into a plurality of paragraphs in a first language;
    storing the paragraphs and a unique identifier corresponding to each paragraph in the document translation database;
    translating, by the computing device, the paragraphs into a second language, said second language being different than the first language;
    storing, by the computing device, each of the translated paragraphs in the second language and its corresponding unique identifier in the document translation database;
    detecting a location of a cursor hovering over a particular paragraph in the first language of the accessed document; and
    in response to the detecting, presenting the translated paragraph corresponding to the particular paragraph to a client based on unique identifier of the particular paragraph and the document address.

2. The method of claim 1, wherein the document comprises one or more of the following: a web page, a word processing document, a spreadsheet document, a slide show presentation document, an email message and a text document.

3. The method of claim 1, wherein a web crawler is used to determine the document address for the document.

4. The method of claim 1, wherein the paragraphs are translated into additional paragraphs in a third language and the additional paragraphs are stored in the database.

5. The method of claim 1, further comprising:
    receiving, by the computing device, a request from a client, the request including the document address;
    retrieving, by the computing device, the paragraphs in the second language from the database based on the document address;
    sending, by the computing device, the translated paragraphs in the second language to the client wherein the client renders the translated paragraphs in the second language.

6. The method of claim 5, wherein the client renders the translated paragraphs in the second language in a browser executing on the client.

7. The method of claim 5, wherein the document address is an URL.

8. A computerized system for creating a document translation database, said system comprising:
a computer processor connected to a document translation database; and
a computer-readable storage media for storing computer-executable instructions, said instructions executable by the computer processor for:
storing, by the computing device, a document address for a document in the document translation database, the document including text in a first language, wherein the storing is recursively performed according to a set of policies;
determining a document address for the document stored in the document translation database;
accessing the document based on a document address from the document translation database;
parsing the accessed document into a plurality of text data in a first language, each text data having a unique identifier;
translating the parsed text data into translated text data in a second language, said second language being different than the first language;
storing each translated text data in the second language in the document translation database referenced to its unique identifier and the document address; and
when detecting a location of a cursor hovering over the text data in the first language in a particular document, presenting the translated text data in the second language to a client based on the document address of the particular document and based on the unique identifier of the text data.

9. The system of claim 8, wherein the document comprises one or more of the following: a web page, a word processing document, a spreadsheet document, a slide show presentation document, an email message, and a text document.

10. The system of claim 8 further comprising computer-executable instructions for recursively crawling a network to determine the document address for the document.

11. The system of claim 8 further comprising computer-executable instructions for:
dividing the text into a plurality of paragraphs, each paragraph including text data in the first language; and
assigning a paragraph ID to each of the plurality of paragraphs;
translating each of the plurality of paragraphs in the first language to the plurality of paragraphs in the second language; and
for each of the plurality of paragraphs, storing the translated text data in the second language associated with the paragraph ID in the document translation database wherein a client requests the translated text data in the second language based on the document address and the paragraph ID.

12. The system of claim 8 further comprising computer-executable instructions for:
translating the parsed text data into additional text data in a third language; and
storing the additional text data in the third language in the database.

13. The system of claim 8, further comprising:
receiving a request from a client, the request including the document address;
retrieving the translated text data in the second language from the document translation database based on the document address;
sending the translated text data in the second language to the client wherein the client renders the translated text data in the second language.

14. The system of claim 13, wherein the client renders the translated text data in the second language in a browser executing on the client, and wherein the document address is an URL.

15. One or more tangible computer-readable storage media for storing computer-executable instructions to create a document translation database, the computer-executable instructions executed by a computing device, said computer-executable instructions comprising:
storing a document address for a document in the document translation database, the document including text in a first language, wherein the storing is recursively performed according to a set of policies;
accessing the document based on the document address stored in the document translational database;
parsing the accessed document into a plurality of text data in a first language, each text data having a unique identifier;
translating the parsed text data into translated text data in a second language, said second language being different than the first language;
storing each translated text data in the second language in the document translation database referenced to the unique identifier and referenced to the document address; and
presenting the translated text data in the second language to a client based on the unique identifier and the document address when detecting a location of a cursor hovering over the text data in the first language.

16. The tangible computer-readable storage media of claim 15 further comprising computer-executable instructions for:
dividing the text into a plurality of paragraphs, each paragraph including text data in the first language; and
assigning a paragraph ID to each of the plurality of paragraphs;
translating each of the plurality of paragraphs in the first language to the plurality of paragraphs in the second language; and
for each of the plurality of paragraphs, storing the translated text data in the second language associated with the paragraph ID in the document translation database wherein a client requests the translated text data in the second language based on the document address and the paragraph ID.

17. The tangible computer-readable storage media of claim 15 further comprising computer-executable instructions for:
receiving a request from a client including the document address;
retrieving the translated text data in the second language from the database based on the document address included in the request;
sending the translated text data in the second language to the client wherein the client renders the translated text data in the second language, wherein the client renders the translated text data in the second language in a browser executing on the client, and wherein the document address is an URL.

* * * * *